United States Patent [19]

Mueller et al.

[11] 4,136,561

[45] Jan. 30, 1979

[54] APPARATUS FOR AUTOMATICALLY SENSING AND RECORDING DATA IN A SEWAGE SYSTEM

[75] Inventors: Frederick N. Mueller, Dallas; Ronald W. Chandler, Plano, both of Tex.

[73] Assignee: Tetradyne Corporation, Carrollton, Tex.

[21] Appl. No.: 803,773

[22] Filed: Jun. 6, 1977

[51] Int. Cl.² ...................... G01F 23/04; G01W 1/14; G01D 11/24
[52] U.S. Cl. ........................................ 73/171; 73/431; 360/6; 361/393
[58] Field of Search ................. 73/171, 431; 324/156; 361/380, 393, 394; 138/108; 360/6

[56] References Cited

U.S. PATENT DOCUMENTS

| | | | |
|---|---|---|---|
| 3,243,999 | 4/1966 | Barker | 73/171 |
| 3,781,624 | 12/1973 | Tullis | 33/126.6 |
| 3,792,445 | 2/1974 | Bucks | 360/6 |
| 3,935,592 | 1/1976 | Dahlen | 360/6 |
| 4,022,059 | 5/1977 | Schontzler | 141/130 |
| 4,058,011 | 11/1977 | Martig | 73/215 |

*Primary Examiner*—S. Clement Swisher
*Attorney, Agent, or Firm*—Richards, Harris & Medlock

[57] ABSTRACT

The specification discloses a control module having circuitry for generating control and timing signals and for receiving digital data. A plurality of sensor modules are connected to the control module and each contains devices for sensing various physical characteristics, such as water level, rainfall or the like. In response to control signals generated by the control module, each of the sensor modules is operable to input digital data representative of the sensed physical characteristics to the control module. A recorder is connected to the control module and includes a removable recording cassette for recording the digital data transmitted from the sensor modules. The recorder also records the identification of the sensor module transmitting data, along with the calendar day and the time of day that the data was transmitted.

16 Claims, 9 Drawing Figures

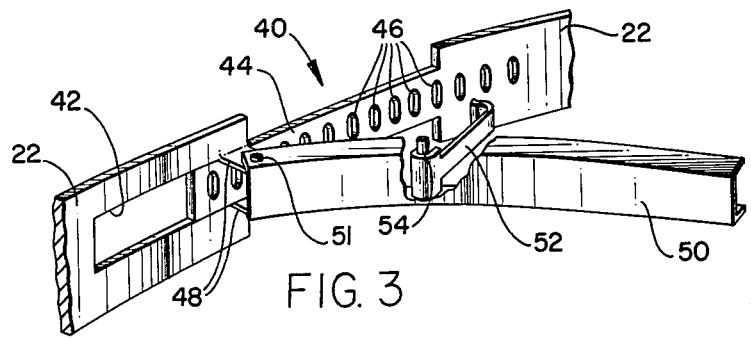
FIG. 3
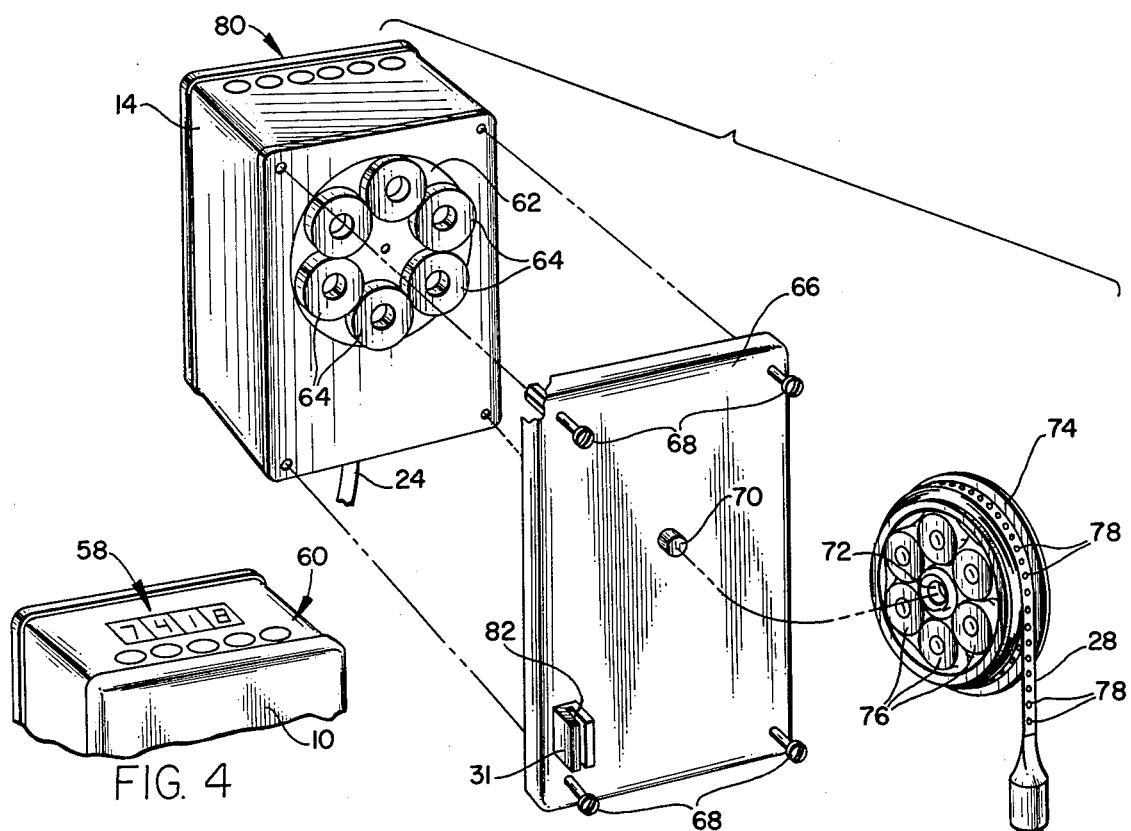
FIG. 4
FIG. 5
FIG. 6

APPARATUS FOR AUTOMATICALLY SENSING AND RECORDING DATA IN A SEWAGE SYSTEM

FIELD OF THE INVENTION

This invention relates to automatic data acquisition systems, and more particularly relates to apparatus for automatically recording digital data regarding physical characteristics of a sewage system.

THE PRIOR ART

It is often necessary for municipalities to obtain detailed information about the operation of their sewage systems. For example, before certain types of funding can be obtained by municipalities, a substantial amount of data is required regarding the water infiltration of the municipality's sewer system. Systems have thus been heretofore developed for metering the water flow in a sewage system. Many such systems detect the level of water in a sewage pipe and then the dimensions of the pipe are utilized to determine the flow rate.

Problems have occurred with many prior monitoring systems in that they require substantial maintenance due to the very dirty environment of the sewer. Moreover, prior systems have required periodic visits by personnel to obtain data therefrom and have not been able to automatically operate for any substantial period of time. Further, the data provided by many prior systems has not been satisfactorily accurate, nor readily adaptable for easy input into automatic processing environments.

A need has thus arisen for an automatic sewage monitoring system which can operate for long periods of time without maintenance problems and without human intervention, and yet provide detailed information regarding numerous characteristics of water infiltration including flow rates, water depths, rainfall and the like. Such a system should be able to automatically record in an accurate manner such data in a form which may be easily input into an automatic digital processing machine.

SUMMARY OF THE INVENTION

The present invention provides a sewage monitoring system which substantially eliminates or reduces the problems heretofore associated with the prior monitoring systems, and the present sewage monitoring system substantially meets and solves the existing needs for an automatic monitoring system for a sewage environment.

In accordance with the present invention, an automatic data acquisition system is provided which includes a control module including circuitry for generating control signals and for receiving digital data through a plurality of terminals. A plurality of sensor modules have structure for being removably attached to the control module terminals and each include circuitry for sensing a different physical characteristic. The sensor modules are operable in response to control signals from the control module to input digital data representative of the sensed physical characteristics to the control module, along with identification data identifying the source of the digital data. A recorder module includes structure for being removably connected to one of the control module terminals and includes a removable recording cassette. The recorder module further includes a recording head for periodically and sequentially recording digital and identification data from the sensor modules. The control module periodically interrogates the sensor modules and receives digital and identification data transmitted from the sensor modules and causes the data to be recorded on the recording cassette.

In accordance with another aspect of the invention, apparatus for recording data in a sewage system includes an expansion ring having a diameter approximating the inner diameter of a sewer manhole. Structure expands the diameter of the ring for rigidly attaching the ring against the manhole interior near the upper region of the manhole. The expansion ring includes connectors at spaced points around the ring. A plurality of hermetically sealed electronic modules each have structure for being removably attached to the connectors and includes electrical cables for electrically interconnecting the modules. A plurality of the modules include devices for sensing physical characteristics of the sewage system and for generating electrical representations of the physical characteristics. One of the module includes structure for recording the electrical representations.

In accordance with yet another aspect of the invention, apparatus for automatically sensing and recording data in a sewage manhole includes a hermetically sealed control module having circuitry for providing timing and control signals. A water level detector is connected to the control module for detecting the level of water in the manhole. A rainfall detector is connected to the control module for detecting the amount of rainfall. A recorder is connected to the control module for recording the level of water and the amount of rainfall detected by the detectors. A display on the control module has switches disposed within the hermetically sealed module. The display is operable to display data received from the detectors. Devices are provided to actuate the switches from the exterior of the module in order to selectively display data generated from the detectors.

In accordance with yet another aspect of the invention, a liquid level detector includes a detector module for being mounted above the liquid level. An elongated member includes probes on the end thereof and wires extend from the probes through the elongated member to the module. A motor in the module raises and lowers the elongated member. Circuitry is provided to control the motor to periodically lower the elongated member until the probes contact the liquid and to then raise the probes to a predetermined distance above the liquid. Circuitry in the module is connected to the wires for generating electrical signals representative of the liquid level.

In accordance with yet another aspect of the invention, a liquid level detector includes a detector module mounted above the liquid level. A reel is rotatably mounted on the module. Structure in the module is provided to rotate the reel. A flexible elongated tape is wound on the reel and has a lower portion hanging from the module toward the liquid level. Probes are attached to the lower portion of the tape for detecting the presence of liquid. Structure is spaced along the tape and circuitry in the module is responsive to this structure for determining the position of the probe.

DESCRIPTION OF THE DRAWINGS

For a more complete understanding of the present invention and for other objects and advantages thereof, reference is now made to the following description taken in conjunction with the accompanying drawings, in which:

FIG. 3 is a partially broken away view of the adjustment clamp for the present expansion ring which supports the system inside a sewage manhole;

FIG. 4 is a partially broken away top view of the control module of the invention;

FIG. 5 is an exploded view of the water level detector module of the invention;

FIG. 6 is a front view, with the front panel removed, of the recorder module of the invention;

DESCRIPTION OF THE PREFERRED EMBODIMENT

Figure 1:
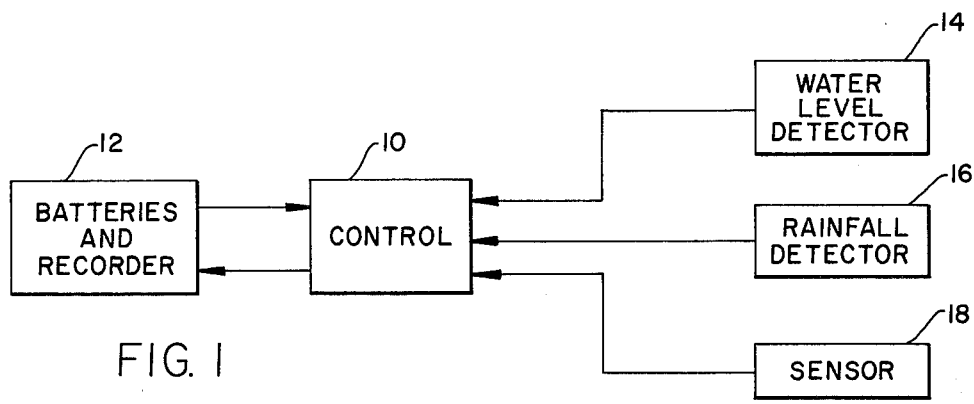
FIG. 1 is a block diagram of the basic elements of the present system.

Referring to FIG. 1, a block diagram of a preferred embodiment of the present invention is illustrated. A control module 10 includes circuitry for generating timing and control signals and for receiving digital data. Control module 10 includes input terminals for being removably connected to a plurality of sensors or detectors. A battery and recorder module 12 is interconnected with the control module 10 to supply battery power and to enable recording of data supplied to the control module 10. A plurality of detectors or sensors, each of which senses a different physical characteristic, may be removably interconnected with the control module 10. In the illustrated embodiment, a water level detector 14, a rainfall detector 16 and a sensor 18 are connected to the control module 10.

An important aspect of the present invention is that numerous combinations of various detectors and sensors may be connected to the control module 10 in order to provide a wide variety of condition detection. The sensor 18 may comprise, for example, a sensor to detect pressure, temperature or voltage from a strain gauge bridge or the like. Such sensors generate analog signals which are converted to digital data and applied to the recorder 12.

In certain circumstances, it will be desirable to use sensors 18 which directly generate digital or binary signals. For example, sensor 18 may comprise a plurality of switches, the state of which generate various binary words which are recorded on the recorder 12 without the requirement of conversion from analog. For example, a plurality of switches may be placed on valves at a pumping station. The switches will then sense whether or not the valves are open or closed in order to enable recording of the state of each of the valves when the pumps are energized.

The control module 10 serves to periodically sample the output from the detectors and sensors 14-18 in order that the data therefrom may be recorded on the recorder 12. The control module 10 includes clock circuitry for generating electrical representations of the time and data view for recording on the recorder 12. The control module 10 also provides periodic control signals for the water level detector, as will be hereinafter described. The control module 10 further includes switches which may be operated to display timing information and data generated by one of the detectors.

As will be subsequently described, the control module is hermetically constructed such that the switches therein may be operated exteriorly without introducing debris or water into the control module housing. Similarly, the water level detector 14 and the other detectors and sensors of the invention are constructed hermetically, such that debris or liquid cannot penetrate into the housings through openings for switches or the like. The batteries 12 in the preferred embodiment are sufficient to enable operation of the recorder and the remainder of the system for one month, assuming readings are periodically taken every ten minutes from each of the detectors and sensors 14-18.

Figure 2:
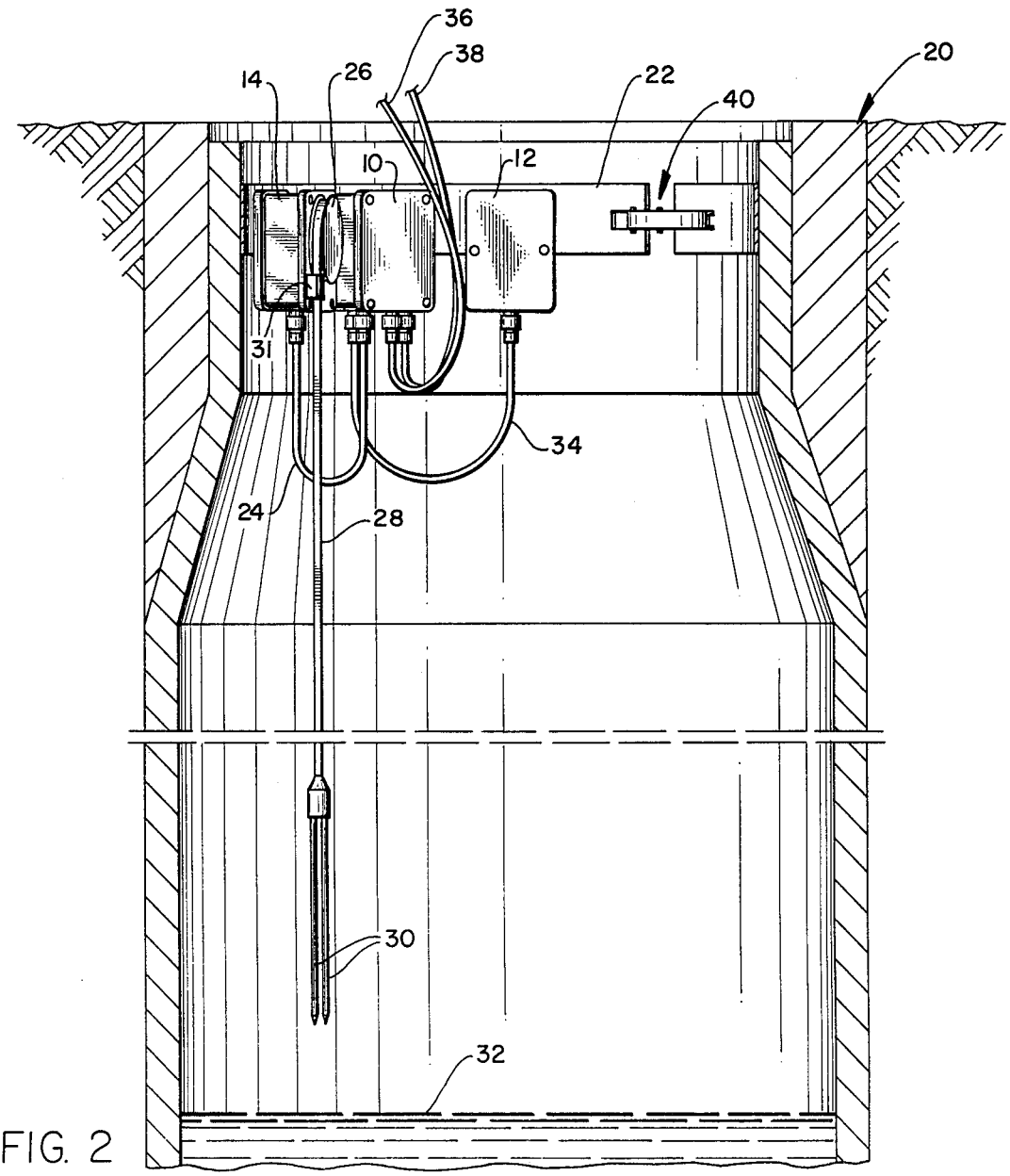
FIG. 2 is a sectioned view of a sewage manhole illustrating the typical installation of the present system in the manhole.

FIG. 2 illustrates the attachment of the present system adjacent the mouth of a sewer manhole which is generally identified by the numeral 20. The control module 10 may be seen to comprise a rectangular hermetically sealed housing suitably attached to a flexible metal expansion ring 22 which fits within the internal diameter of the manhole 20. The water level detector 14 comprises a rectangular housing removably attached to ring 22 and connected by an electrical cable 24 to the control module 10. A reel 26 is rotatable by a suitable motor within the water level detector housing 14 in order to wind and unwind a tape 28. Liquid detector probes 30 are mounted on the lower end of the tape 28 in order to detect the level of liquid 32 within the manhole 20. The tape 28 has a plurality of periodically spaced apertures along its length. Tape 28 extends through a tape reading device 31 on module 14 which detects the position of the tape 28. Tape 28 includes two wires extending from module 14 along the length thereof for connection with probes 30 in order that circuitry within module 14 can provide an indication of the level of liquid 32. The batteries and recorder module 12 are also mounted on the metal ring 22 and are interconnected via an electrical cable 34 with the control module 10. Electrical cables or leads 36 and 38 extend from the bottom of the control module 10 to the rainfall detector 16 and to the sensor 18 which are remotely disposed from the manhole 20.

Each of the modules 10, 12 and 14 may be removably attached to the ring 22 by any suitable structure. For example, female members may extend from the housings 10, 12 and 14 for being received by male members attached to the ring 22.

The ring 22 comprises an integral elongated flexible metal strip bent to form a circle. A catch 40 connects the ends of the ring 22 together and maintains tension against the ends of the ring 22 sufficient to maintain the ring 22 against the inner wall of the manhole 20.

In a typical operation of the system shown in FIG. 2, the level detector module 14 will be connected to the control module 10, along with a rainfall detector module and another sensor which are connected to leads 36 and 38. As will be subsequently described in greater detail, the control module 10 includes five magnetically operable switches along with a four digit display. When the first switch is operated by disposing a magnet adjacent the switch, the display illustrates the number of the day of the year which will be a number between "1" and "365". When a magnet is disposed adjacent the second switch, the present time to the nearest minute in military time is displayed. When a magnet is disposed adjacent the third switch, the data presently being input by the water level detector 14 is displayed. When a magnet is disposed against the fourth switch, the data currently being input by the rainfall detector 16 is displayed. When a magnet is disposed adjacent the fifth switch, the data generated by the sensor 18 is displayed. In this manner, an operator may obtain a periodic reading from the system, without having to open the hermetic seal of the control module 10. In addition, the operator can perform maintenance checks of the operation of the system in this manner.

As will be subsequently shown, the top of the water level detector 14 also includes six magnetically operable switches which may be operated by disposing a permanent magnet adjacent thereto. Each of the switches is turned momentarily on due to the presence of the magnet, and is turned off when the magnet is removed. The first switch on the water level detector 14 is operable to withdraw the tape 28 to its fully retracted up position. The second switch automatically moves the tape downwardly until the probes 30 touch the water and then raises the tape to move the probes a predetermined distance above the water, as for example, six inches. The third, fourth, fifth and sixth switches in the top of the water level detector 14 are operable to set in the depth of a particular manhole within the system. These four switches enable the setting of depth in feet, with the first switch setting in the 10's of feet, the second switch feet units, the third switch tenths of feet, and the fourth switch one hundredths of feet. These switches may only be set by a magnet when the tape 28 is in the fully retracted up position. The set depth of the manhole unit enables the system to stop downward movement of the probes 30 when the probes hit the bottom of the manhole if there is no water in the manhole. Otherwise, the tape 28 could keep downwardly extending in the case of a dry manhole.

When the proper manhole depth has been set into the water level detector 14, the system operates to periodically energize the water level detector 14 to rotate the reel 26 in order to lower the tape 28 until the probes 30 touch the water level in the manhole. For example, in normal practice, the tape 28 would be lowered every ten minutes, although this time period may be varied if desired. When the probes 30 touch the water, the reel 26 is reversed in order to retract the tape 28 to move the probes 30 a predetermined distance above the water level, such as six inches. The system records the depth at which the probes 30 touched the water and records that step in the recorder 12. If the water level rises within the predetermined ten minute interval and touches the probes 30, the depth is recorded and the probes 30 are raised approximately six inches above the water level.

At a predetermined time each day, such as at midnight, the probes 30 are automatically fully retracted to the up position and the preset manhole depth is again reloaded into the system. The probes are then dropped until they touch the water and withdraw six inches and resume operation. In this manner, any errors which have accumulated in the position of the tape 28 during the day are eliminated.

The rainfail detector 16 is normally reset to zero at a predetermined time, such as at midnight. When rain occurs, the detector collects the rainfall and when interrogated by the control module 10 on ten minute intervals, the rainfall detector 16 generates a digital signal representative of the rain level in one-hundredths of an inch increments.

The recorder in the recorder module 12 records at predetermined intervals, such as the ten minute interval previously described, the outputs generated from the water level detector 14, the rainfall detector 16 and the sensor 18. On the recorder, an identifying signal is recorded to indicate which of the detectors is presently generating the information, followed by digits containing the time of the day and the information from the particular interrogated detector. Each hour, the recorder automatically records the day of the year and the serial number of the recorder. At the end of one month, the cassette may be removed from the recorder 12 and input into a digital computer which formats and displays the data recorded by the system.

FIG. 3 illustrates in greater detail the catch 40 for interconnecting the ends of the expansion ring 22. One end of ring 22 includes a cutout portion 42 dimensioned to receive a male member 44 extending from the other end of the ring 22. A plurality of apertures 46 are formed in the male member 44. Ears 48 extend from opposite sides of the cutout portion 42 and are pivotally connected at a pivot 51 to a handle 50. A hook member 52 is pivotally connected at pivot 54 to a midpoint region of the handle 50.

In operation of the catch 40, the male member 44 is inserted into the cutout portion 42. The hook end of the hook member 52 is inserted through a suitable one of the apertures 46. The handle 50 is then pivoted toward the ring 22 in order to tension the ends of the ring 22 away from one another in order to firmly force the ring 22 against the inner walls of the manhole 20.

FIG. 4 illustrates the top portion of the control module 10 and shows the display generally identified by the numeral 58 which comprises a four digit, seven segment, light emitting diode (LED) readout. This display 58 provides an easy to read display of the date, time and the present data input by the three detectors 14–18. This display may be easily seen by an operator looking from the top of the manhole.

As previously noted, five magnetically operated switches are provided within the controller module 10. These switches are hermetically sealed within the top of the module 10 away from dirt, debris and liquid. The position of the switches are marked on the housing by five circle indicia 60. The switches may be momentarily actuated by a permanent magnet disposed at a suitable location adjacent the switches exterior to the module 10. In this way, the switches may be set to the desired position without the necessity of external mounted switch knobs and the like. As noted, the switches enable control of the data displayed in the display 58. For example, when a permanent magnet is touched to the first circle indicia 60, the number of the calendar day is displayed in display 58. When the magnet is touched to the second circle indicia 60, the time in military hours and minutes is displayed in display 58. If the magnet touches one of the remaining three circle indicia 60, the most recent data output from the respective detectors 14–18 is displayed in display 58.

FIG. 5 illustrates an exploded view of the water level detector module 14 which comprises a first rectangular housing 14 having a rotatable drive wheel 62 which includes six permanent magnets 64 mounted thereabout. Drive wheel 62 is rotated by the motor within the module 14 in dependence upon control signals generated from the control module 10. The motor may comprise in the preferred embodiment a D.C. brush type motor. A cover plate 66 is mounted over drive wheel 62 and the magnet 64 and is attached by bolts 68 to the module 14. A rigid projection 70 is provided on the exterior of the cover plate 66 for mating with an aperture 72 formed in a circular reel 74. Reel 74 includes six permanent magnets 76 which are attracted to the magnets 64. The elongated tape 28 is wrapped about the reel 74 and includes the probes 30 on the end thereof. Apertures 78 are spaced along the tape 28 to enable control of the position of the probes 30 in a manner to be subsequently described.

In operation of the water level detector module 14, the reel 74 is mounted with the projection 70 being received in the aperture 72. The magnets 76 are attracted to magnets 64. When the drive wheel 62 is rotated by the stepping motor, rotation of the magnets 64 also cause rotation of the magnets 76. This causes rotation of the reel 74 in order to either retract or extend the tape 28 and the probes 30, depending upon the direction of rotation of the motor. With the use of the magnetic coupling drive of the invention through cover plate 66, a hermetic seal is maintained such that dirt and debris cannot enter the module housing through the drive. The module is thus able to withstand the dirty environment of a sewer without maintenance problems.

Referring to FIG. 6, the battery and recorder module 12 is illustrated, with the cover removed. The tape reading device 31 is mounted on the plate 66 and comprises a housing having a slot 82 therein for receiving the tape 28. As will be subsequently described in greater detail, device 31 includes light emitting diodes and photosensitive devices in order to detect the passage of the aperture 78. In this manner, the position of the tape 28 enables the position of the probes 30 to be accurately detected.

The battery and recorder module 12 comprises a rectangular housing dimensioned to retain five storage batteries 86 for providing power to the recorder, to portions of the control module 10 and to the various detectors and sensors of the invention. In the preferred embodiment, batteries 86 comprise heavy duty alkaline batteries such as the EverReady No. E-95 battery. Separate rechargeable batteries are connected to maintain data stored in the system even though the recorder is disconnected.

The batteries are interconnected through leads 87 to power the system, which includes a recorder motor 88 which drives the recorder capstan 90. In the preferred embodiment, the motor 88 comprises a stepping motor such as a four phase permanent magnet motor having each phase energized sequentially in order to step 1/48th of a revolution for each control pulse received. The use of the stepping motor provides excellent control of the capstan 90 to provide good recording characteristics for the digital signals generated by the system. The capstan 90 operates a conventional magnetic tape recording cassette 92 in order to record the data transmitted by the sensors and by the timing circuitry of the invention. A clip member 94 holds the cassette 92 in the desired location. An important aspect of the present invention is that the cassette 92 is slidably mounted along slots 96 formed in the side of guide 98, to enable sliding removal of the cassette 92. Further, bracket 100 is slidably movable in and out of the module housing to enable easy removal of the cassette and to enable maintenance if desired. Flexible pads 102 are mounted on the end of the bracket 100 in order to prevent vibration of the system during recording.

As previously noted, the cassette 92 contains enough capacity to enable the recording of all of the data from the system for up to one month. At the end of that period, an operator unfastens the back of the module housing 12, moves the cassette 92, replaces the cassette with a new cassette and then replays the digital data contained within the cassette 92 into a digital computer system for analysis.

THE CONTROL MODULE CIRCUITRY

Figure 7:
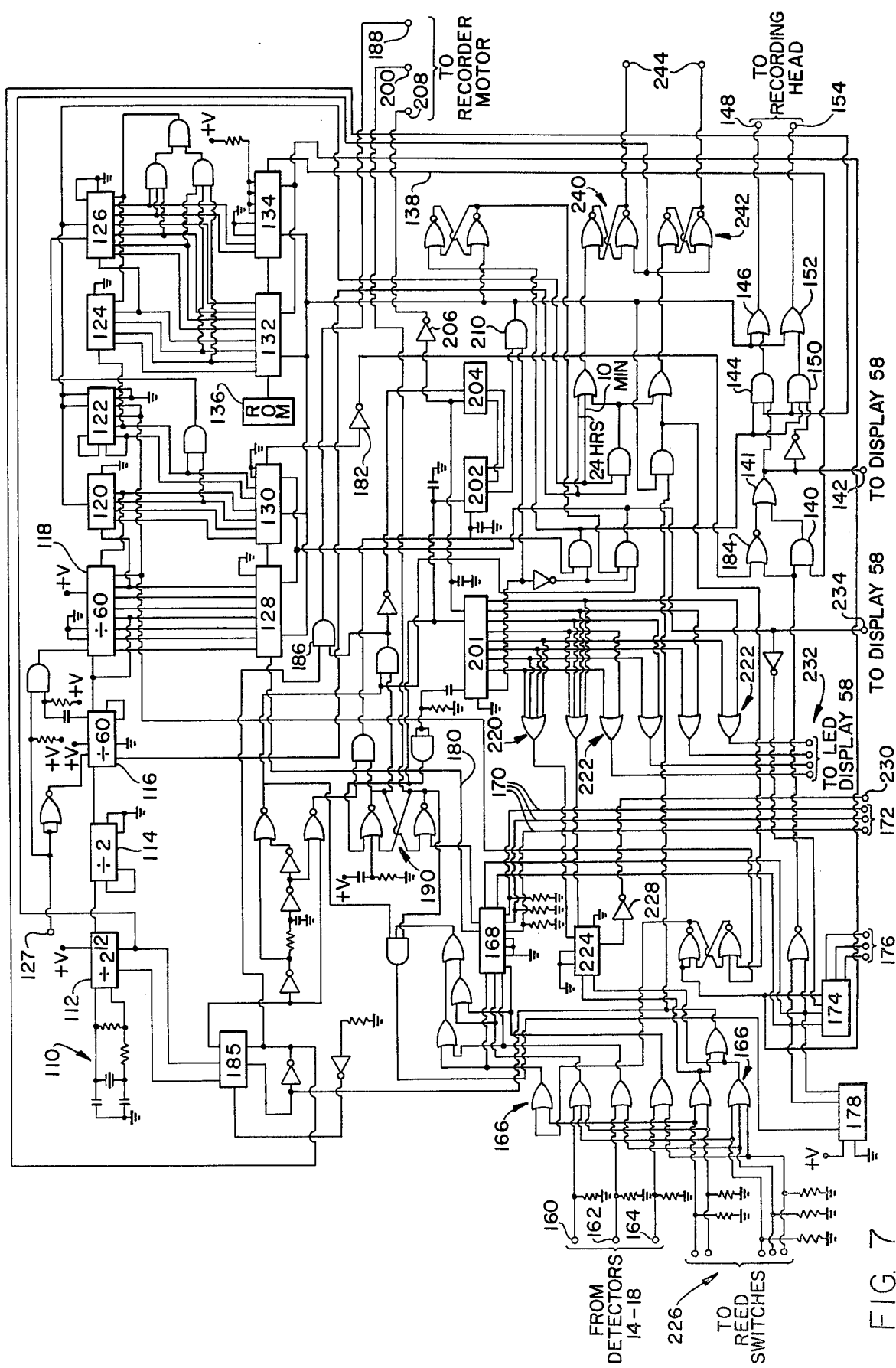
FIG. 7 is a detailed schematic diagram of the circuitry of the control module.

FIG. 7 is a schematic diagram of the circuitry contained within the control module 10 in order to provide control to the various detectors of the invention, to provide timing signals and to provide digital signals for being recorded on the cassette recorder. As shown in FIG. 7, a crystal frequency source generally identified by the numeral 110 generates a constant frequency signal which in the preferred embodiment comprises 32,768 Hz. This constant frequency signal is applied to a divide-by-$2^{12}$ divider 112. The divided signal is then applied to a divide-by-2 divider 114 which applies the clock frequency to a divide-by-60 divider 116. The output of divider 116 is applied to a divide-by-60 divider 118, the output of which is applied to dividers 120 and 122 which provide a division by 24.

The output from divider 122 is applied to dividers 124 and 126 which provide a division by 365. Dividers 112–126 provide clock and calendar signals in order to provide the previously described display on the LED display 58 (FIG. 4). The divider 112 may comprise, for example, a 4060 divider, while dividers 114 and 122 may comprise, for example, a 4013 divider. Dividers 116, 118 and 126 may comprise, for example, 4566 dividers. Divders 120 and 124 may comprise, for example, 4518 dividers.

The output of divider 114 comprises pulses at a rate of one per second. The output of divider 116 has a repetition rate of one pulse per minute. A terminal 127 is tied through a NOR gate and an AND gate to dividers 116 and 118. If it is desired to change the time and/or date generated by the control system, a separate oscillator may be connected at terminal 127 in order to advance the dividing counters faster than the normal rate in order to set the clock ahead. In this manner, the time and/or date set in the shift registers of the inventions may be selectively changed. The output of divider 118 has various repetition rates of minutes and tens of minutes and are applied to a shift register 128. The output from dividers 120 and 122 represent hours and tens of hours and are applied to shift register 130 for storage. The output of dividers 124 and 126 comprise days, tens of days and one hundred days and are applied to shift registers 132 and 134.

A read only memory (ROM) 136 is connected to shift register 132. ROM 136 stores an identification number of the particular system. Under the control of this system, once per hour the serial number stored in the ROM 136 and the calendar date number are shifted out from the shift registers 132 and 134 via lead 138 to an AND gate 140. The output of gate 140 is applied through an OR gate 141, the output of which is applied to terminal 142. Terminal 142 is connected to the LED display 58 (FIG. 4) in order to display the serial number and the calender date. The output of gate 141 is also applied to an AND gate 144, the output of which is applied through an OR gate 146 to terminal 148. The output of gate 141 is also applied through an inverter to an AND gate 150, the output of which is applied through an OR gage 152 to a terminal 154. Terminals 148 and 154 are applied to the recording head of the recorder module 12 in order that the serial number and calendar date may be recorded on the magnetic recorder.

Prior to transmitting data to be recorded on the recording head via terminals 148 and 154, a positive indicator pulse is automatically generated by the circuitry. A digital one is applied to both terminals, in order to indicate that data is about to be generated to the recorder.

Each detector 14–18 has a data available line which goes logic high when data is available from the detector. The data available lines from the detectors are applied to terminals 160, 162 and 164. For example, terminal 160 may be connected to the data available line from water level detector 14 and terminal 162 connected to the rainfall detector 16. The terminals 160–164 are connected through four OR gates generally identified by the numeral 166. The outputs of gates 166 are connected to a data selector circuit 168, which may comprise, for example, a 4539 circuit. Data selector circuit 168 is also connected to three leads 170 which are connected to three terminals 172. Each of the terminals 172 is connected to a data input line from one of the detectors 14–18 in order to receive data therefrom.

The data selector circuit 168 is further connected to a decoder 174 which is connected to three terminals 176. Terminals 176 are connected to the detectors 14–18 in order to supply clock pulses thereto. Decoder 174 may comprise, for example, a 4555 circuit and is controlled by other gating logic, including the counter 178 which may comprise a 4520 counter.

In operation, the data selector circuit 168 detects a logic high on the terminals 160–164. When a logic high is detected, thereby indicating that data is available from one of the detectors 14–18, the decoder 174 is actuated to supply clock signals from the clock circuitry through a selected one of the terminals 176. The clocking signals cause data to be shifted out from the selected detector, the data then being clocked in through one of the terminals 172. The data is applied through the data selector circuit 168 and is output via lead 180 to the registers 128 and 130.

As the data is clocked into the registers 128 and 130, the time of the day previously stored in the registers 128 and 130 is clocked out through the inverter 182 to an OR gate 184. The data is then applied through gates 141, 144, 146, 150 and 152 to terminals 148 and 154 for application to the recording head of the recorder. In this manner, data is recorded in serial digital form on the recorder, the data being preceded by the time of the day. As previously noted, data is recorded, if available, from each of detectors 14–18 after each ten minute period. However, in case data is available before the expiration of the ten minute period, such as if the water level rises to contact probes 30, then data is automatically sensed and recorded at that time.

A two input AND and OR logic circuit 185 is connected to receive the output from divider 112. The circuit 185 may comprise, for example, a 4085 gating circuit. An output from circuit 185 is applied through an AND gate 186 to a terminal 188 in order to generate stepping control pulses for the recorder motor 88. Each time the terminal 188 goes logically high, the motor 88 is stepped one step. An enable signal is generated by a latch circuit 190, which comprises two interconnected NOR gates and is transmitted to turn the recorder motor 88 on via terminal 200.

Binary counters 201 and 202 operate in conjunction with circuit 204 to generate clock and control lines in order to advance the recorder motor 88 and also to control the display 58. Counter 201 may comprise a 4017 counter, while counter 202 may comprise, for example, a 4520 counter. Decoder 204 may comprise a 4555 circuit. An output from decoder 204 is transmitted through an inverter 206 and applied to terminal 208 in order to generate a display latch signal in order to latch the presently displayed data in the display 58. Counters 201 and 202 generate signals which are applied through an AND gate 210 which controls the shift registers 128, 130, 132 and 134 and which also are applied through OR gates 146 and 152 in order to control the operation of the recording head of the recorder.

In the preferred embodiment, forty bits are provided for recording each block of data. Counters 201 and 202 and associated circuitry control this data blocking. The first three bits of the block are blank. The fourth bit comprises the indicator pulse previously described to indicate that data is forthcoming. The remaining thirty-six bits are reserved for data, including the time of the day and an indication of which detector is transmitting information.

Counter 201 applies signals to OR gates 220 and to four OR gates 222. Gates 220 are connected to a control circuit 224 which may comprise, for example, a 4085 logic circuit. Five terminals 226 are each connected to one of the five magnetically sensitive reed switches previously described in FIG. 4. As noted, when a magnet is disposed adjacent one of the switches, the switch is switched momentarily on and therefore applies a signal through the respective OR gate 166 to the control circuit 224. The output of circuit 224 is applied through an inverter 228 to terminal 230. Terminal 230 is connected to the LED display 58.

When the particular reed switch has been energized, the circuitry determines whether or not to input time, calendar or detector data. If detector data is chosen, detector data is applied via terminal 142. If calendar or time data is chosen, the data is applied via terminal 234.

The LED display 58 includes a sixteen bit shift register, not shown, connected at its output to four display drivers which drive four conventional seven segment LED displays. The outputs of the OR gates 222 are connected to four terminals 232 which are connected to the LED display 58. The gates 220 and 222, along with their associated circuitry, act as a multiplexing circuit. Thus, only one digit of the four digit display is energized at one time. During that time of energization, four bits are serially shifted in from terminal 230 and displayed as a single digit. Subsequently, the next three digits are then sequentially displayed in the same manner. In this way, when one of the read switches is closed, the closure is sensed at terminals 226 and the desired data is displayed on the LED display 58. For example, as previously noted, closure of the reed switches can cause the day of the year, the time of the day, or data from any of the three detectors 14–18, to be selectively displayed.

Latches 240 and 242 are operable in response to a twenty-four hour indication from the clock circuitry to apply "midnight" indicator signals to terminals 244. Terminals 244 are connected to the water level detector 14 in order to cause the probes 30 to be completely retracted at midnight in order to enable the setting of the depth of the system. In operation, terminals 244 will both go logically high at midnight in order to control the operation of the motor which retracts the probes 30.

THE WATER LEVEL DETECTOR MODULE CIRCUITRY

Figure 8:
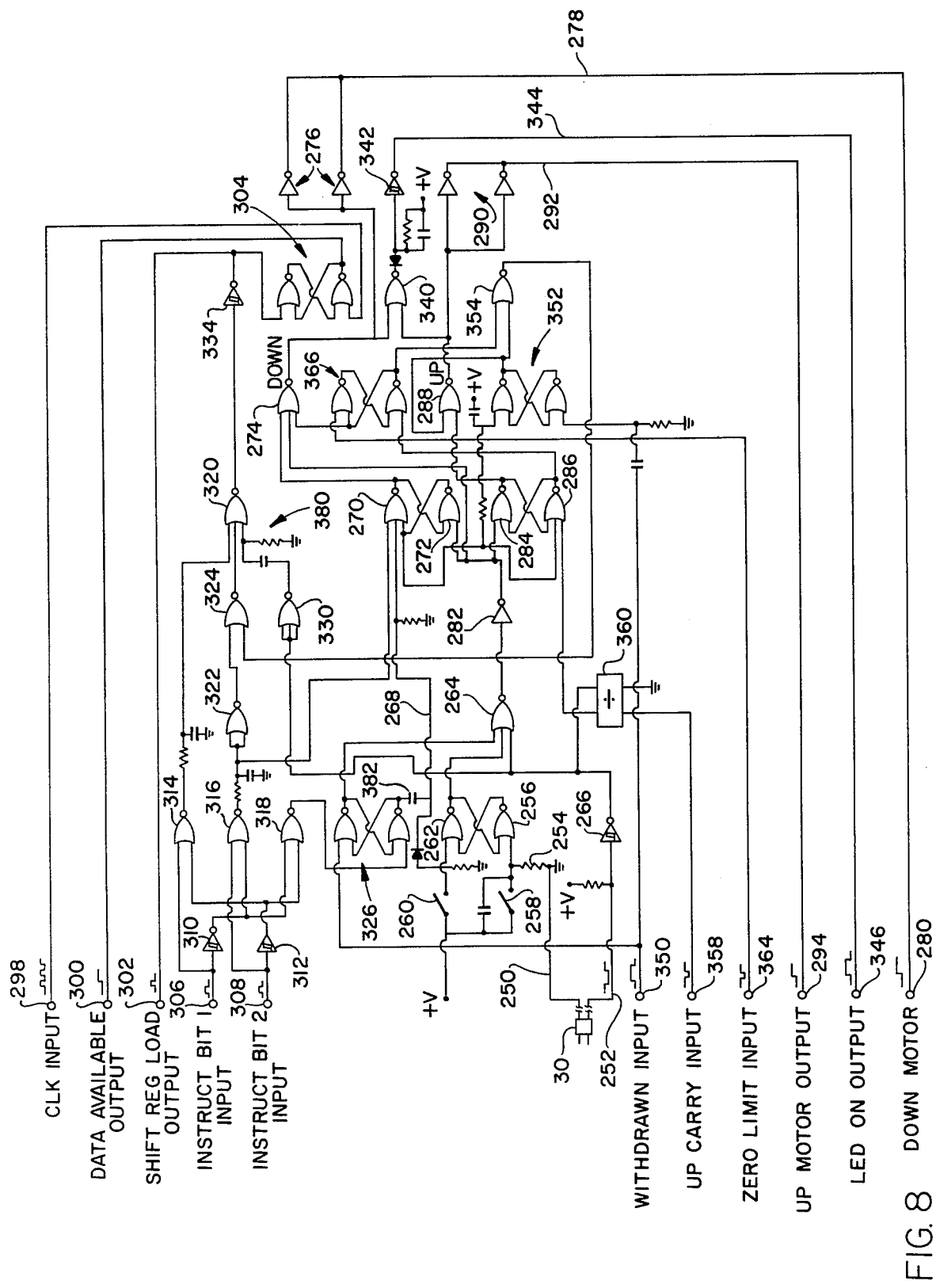
FIGS. 8 and 9 are detailed schematic diagrams of the circuitry within the water level detector module of the invention.
Figure 9:
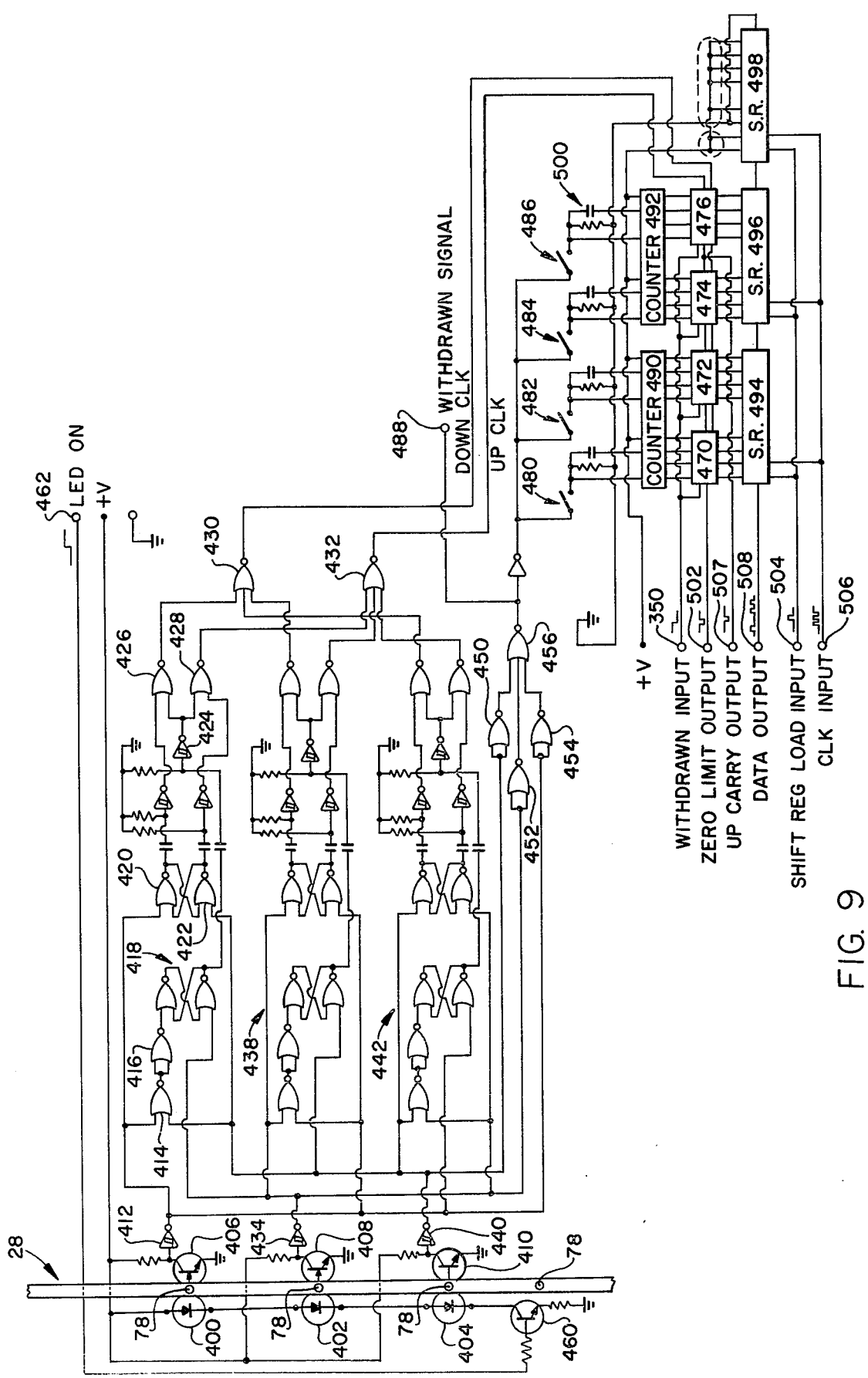

FIGS. 8 and 9 illustrate schematic diagrams of the circuitry contained within the water level detector module 14. The probes 30 are connected via leads 250 and 252 to the circuit. Lead 250 is connected through a resistor 254 to the input of a NOR gate 256 and to one terminal of a reed switch 258. A second reed switch 260 is tied to switch 258 and is connected to an input of an OR gate 262. Gates 256 and 262 are interconnected in a latch configuration. The output of the latch is applied as an input to a NOR gate 264.

The lead 252 is connected to a Schmidt trigger inverter 266 which is tied to another input of gate 264. The reed switches 258 and 260 comprise two of the six switches disposed in the top of the level detector 14 as previously noted in FIG. 5. If a permanent magnet is disposed adjacent switch 260, the switch momentarily closes and sets through lead 268 a down latch comprising NOR gates 270 and 272, assuming other conditions are met. If the down latch is set, a signal is applied through a down NOR gate 274 through buffer drivers 276 in order to supply, via lead 278, a down motor output signal to terminal 280. Terminal 280 is connected to the motor for driving the reel 26 in order to lower the tape 28.

If the switch 258 is closed by disposing a magnet adjacent thereby, the latch comprising gates 256 and 262 is latched to control, through a Schmidt trigger inverter 282, the up or withdraw flip-flop comprising interconnected gates 284 and 286. The setting of the withdraw flip-flop applies suitable logic through the up gate 288 which applies a logic signal through buffer drivers 290 and via lead 292 to the up motor output terminal 294. Terminal 294 is connected to the motor for rotating the reel 26 in order to cause withdrawal of the tape 28.

A clock input terminal 298 is connected to one of the terminals 176 in FIG. 7 in order to receive clock signals input from the control module circuitry, as previously described. A data available output terminal 300 is connected to one of the terminals 160–164, previously shown in FIG. 7, in order to generate a data available signal to the control module circuitry. A shift register load output terminal 302 is connected to one of the terminals 172 shown in FIG. 7 in order to enable output of data from the water level detector to the control module for recording on the recorder module 12. The clock input terminal 298 and the data available output terminal 300 are tied to a flip-flop comprising interconnected NOR gates 304.

An instruct bit one input terminal 306 and an instruct bit two input terminal 308 are connected to receive instruction bits from the control module circuitry in order to perform three different commands. The commands include seeking the water level, loading data into the shift registers of the control module and withdrawing the tape 28 in response to a midnight condition. These two instruction bits are applied through Schmidt trigger inverters 310 and 312 and through NOR gates 314, 316 and 318. The output of gate 314 is applied to an input of a NOR gate 320. The output of gate 316 is applied through NOR gates 322 and 324 to an input of gate 320. The output of gate 318 is applied to a zero set flip-flop 326 which comprises two interconnected NOR gates. The output of flip-flop 326 is applied to an input of gate 264. The output of the Schmidt trigger inverter 266 is also applied through a NOR gate 330 to the input of gate 320. The output of gate 320 is applied through a Schmidt trigger inverter 334 to the data available NOR gate flip-flop 304.

The outputs of the down gate 274 and the up gate 288 are applied through a NOR gate 340 and a Schmidt trigger inverter 342 via line 344 to an LED on output terminal 346 in order to energize the LED display 58. Terminal 350 provides the withdrawn input signal and is tied to an input of the zero flip-flop 326 and to an input of the withdrawn flip-flop 352. The output of flip-flop 352 is applied through a NOR gate 354 to an input of gate 324.

The up carry input terminal 358 is connected to a counter 360 which provides a divide-by-ten function. Counter 360 is also connected to the inputs of gates 264 and 330. The zero limit input terminal 364 is connected to the zero flip-flop 366 which applies an output to gate 354.

The circuitry of FIG. 8 enables a variety of automatic operations to be performed by the water level detector circuitry. For example, as previously noted, when switch 260 is closed by application of a magnet, the reel motor is energized to lower the probes 30. However, if the probes 30 are already in the water, this condition is detected by gate 264 via the Schmidt trigger inverter 266. The output from gate 264 is applied through the Schmidt trigger inverter 282 directly to the input of NOR gate 274. This prevents probes 30 from being lowered further, inasmuch as they are already contacting the water. Furthermore, if the probes 30 have been lowered to the bottom of the manhole, as determined by the manhole depth set into the system, the zero flip-flop 366 prevents gate 274 from lowering the probes.

As previously noted, the gate 274 feeds the buffer motor drivers 276 which are normally at a logic high. If one side of the drivers is pulled to a logic low, the motor is energized via terminal 280 in order to rotate the reel 26 to lower the tape 28 and the probes 30.

In normal operation of the circuitry, each ten minutes, the control module circuitry generates a high pulse which is applied to terminal 306. This high pulse is applied to an input of gate 316 which provides a high level which is applied to the down flip-flop latch comprising gates 270 and 272. This latch controls the operation of the down gate 274 which causes the probes 30 to be lowered until the probes contact the water level.

As long as the probes 30 are out of contact with the water, the input of the Schmidt trigger inverter 266 is held logically high. However, when the probes 30 enter the water, water bridges across the two probes 30 and pulls the input of the Schmidt trigger inverter 266 to a low level. This causes the output of the Schmidt trigger inverter 266 to go high, thereby resetting counter 360. Further, the high output from the Schmidt trigger inverter 266 is detected by gate 330 which applies an input to gate 320 in order to generate, in combination with the RC network 380, a short pulse which is applied through inverter 334 to terminal 302. This causes the counter contents of the circuit of FIG. 9 to be loaded into a shift register. This action causes the depth of the water level when the probes 30 touch the water level to be loaded into the detector circuitry in order to provide an indication of the water level.

The high input of the Schmidt trigger inverter 266 output is also detected by gate 264 which reverses the state of the down flip-flop comprising gates 270 and 272. Gate 264 also sets the up flip-flop comprising gates 270 and 272. Gate 264 also sets the up flip-flop comprising gates 284 and 286 to the up mode. If the zero flip-flop 366 is set to indicate the bottom of the manhole, then the flip-flop 366 is preset. Setting of the up flip-flop to the up mode operates through gates 288 and buffer drivers 290 in order to cause the probes 30 to be raised, unless the probes 30 have been completely withdrawn as determined by the withdrawn flip-flop latch 352. The withdrawn flip-flop latch 352 is reset if the down flip-flop comprising gates 270 and 272 is reset. When the power is initially applied to the circuit, all of the latches are reset.

Once the motor is energized via terminal 294 to raise the probes 30, the probes 30 are continually raised until commanded to go down either manually or automatically, or until counter 360 has counted to a count of five. A count of five by counter 360 indicates that the probes 30 have moved up one-half of a foot such that the probes 30 will stop approximately six inches above the water level, as previously described.

The flip-flop 326 latch is set at midnight by high levels on both terminals 306 and 308. If this condition occurs at midnight, the flip-flop latch 326 operates through gate 264 in order to cause the probes 30 to be raised in the manner previously described. Flip-flop latch 326 is reset when the detector circuitry to be described in FIG. 9 determines that the probes 30 are fully withdrawn. At this point, a signal is generated by the circuitry of FIG. 9 and is applied on terminals 350, thereby resetting the latch 326. Resetting of the latch 326 operates through capacitor 382 in order to apply a down signal to the down flip-flop comprising gates 270 and 272. At this point, the probes 30 begin to again move downwardly. Latch 326 thus operates to ensure that the probes 30 move completely up at midnight and then move downwardly until the probes 30 hit the water and are again then reset six inches above the level of the water.

The data available flip-flop 304 is set by inverter 23 when the probes 30 are withdrawn. This holds the signal on the data available output terminal 300 until a clock input is applied on terminal 298 in order to reset the flip-flop 304. The burst of clock pulses applied to terminal 298 shifts all of the data stored in the circuitry of FIG. 9 out to the control and recorder circuitry.

The operation of the circuitry of FIG. 8 thus causes the probes 30 to be periodically lowered to the level of the water and thereby causes data to be recorded as to the level of the water. The probes 30 are then withdrawn approximately six inches above the level of the water. At midnight, the probes 30 are withdrawn completely to the top position and then moved to the level of the water and again retracted to a level six inches above the surface of the water.

Referring to FIG. 9, circuitry for detecting the level of the probes 30 and for recording such information is shown. The tape 28, as previously noted, includes apertures 78 formed therethrough at regular intervals. The tape 28 passes through the tape reading device 31 which contains three light emitting diodes (LEDs) 400, 402 and 404. LEDs 400-404 are spaced apart vertically by a prescribed distance different from the distance between the apertures 78, except at the top of the tape wherein apertures 78 are spaced equally to the spacing between LEDs 400-404. The tape 28 is illustrated in FIG. 9 in its fully retracted position, wherein the apertures 78 mate with the LEDs 400-404. The LEDs 400-404 generate light which passes through the apertures 78 and is detected by adjacent phototransistors 406, 408 and 410. When an aperture 78 is not adjacent one of the LEDs 400-404, light is not admitted to the adjacent phototransistor 406-410. In this way, the LED-phototransistor combination of the invention is able to determine the distance which the probes 30 are lowered into the manhole.

The output of phototransistor 406 is connected to a Schmidt trigger 412 which is connected through NOR gates 414 and 416 to a latch 418. The output of trigger 412 is also applied to a NOR gate 420, which is interconnected in a latch configuration with a gate 422. The output of latch 418 is applied through a Schmidt trigger inverter 424 to inputs of NOR gates 426 and 428. The two outputs of the latch gates 420 and 422 are respectively connected to inputs of gates 426 and 428. The output of gate 426 is connected to an input of a NAND gate 430, while the output of gate 428 is connected to an input of a NAND gate 432.

The output of phototransistor 408 is connected through a Schmidt trigger 434 to a gate stage generally identified by the numeral 438 which is identical to the stage previously described comprising gates 414-430. Similarly, the collector of phototransistor 410 is connected to a Schmidt trigger 440 which is connected to a stage generally identified by 442 which is identical to the previously described two stages. Each of stages 438 and 442 are connected to inputs of NAND gates 430 and 432.

The outputs of the Schmidt triggers 412, 434 and 440 are further connected through gates 450, 452 and 454 to the inputs of a NAND gate 456. The LEDs 400, 402 and 404 are connected in series with the collector of a transistor 460, the base of which is connected to an LED on terminal 462. The LED On siganl is applied to terminal 462 in order to turn on the LEDs when desired.

In operation of the circuitry thus described in FIG. 9, when an aperture 78 passes between one of the LEDs and the adjoining phototransistor, light passes through the aperture 78 and causes conduction of the phototransistor. Such conduction pulls the input low to the corresponding Schmidt trigger, thereby causing the output of the Schmidt trigger to go high. For example, passage of an aperture 78 past the LED 400 causes the output of the Schmidt trigger 412 to go high. When aperture 78 subsequently passes adjacent LED 402, the output of the Schmidt trigger 434 goes high, thereby setting the latch 418. Latch 418 is reset when an aperture passes adjacent either LED 400 or 404. The latch comprising gates 420 and 422 is set when an aperture 78 passes LED 400 and the latch is reset when an aperture 78 passes LED 404. The two latches in each of the stages 438 and 442 are set and reset in the same way.

In this manner, the latches of the various stages are set and reset as apertures 78 pass various ones of the LEDs, thereby causing pulses to be generated and applied to gates 426 and 428 of each stage. The outputs of gates 426 and 428 of each stage are thus applied to gates 430 and 432 in order to provide up and down clocks which are applied to presettable up/down BCD counters 470, 472, 474 and 476 which are serially connected.

The apertures 78 are normally spaced approximately 0.36 inches apart, while the LEDs 400-404 are spaced apart by 0.24 inches. Thus, each 100th of a foot of movement of the tape results in allowing the passage of light from an LED to a phototransistor, thereby yielding one count which is stored in the circuit for movement of each 0.01 foot.

At the bottom of the tape are three apertures 78 which are spaced apart 0.24 inches. These three apertures are illustrated in FIG. 9, such that light simultaneously passes through all three apertures 78 for simultaneous sensing by phototransistors 406, 408 and 410. Normally, when the tape is not fully retracted, as indicated above, one aperture in the tape would normally be registered between the LED and a phototransistor. However, in the fully retracted position of the tape, all three of the bottom apertures 78 register with the three LEDs and therefore the output of gate 456 goes high to indicate that the tape 28 is fully retracted. This comprises the withdrawn input and is applied to terminals of four parallel connected reed switches 480, 482, 484 and 486. The output from gate 456 is also applied to terminal 488 for application to terminal 350 in FIG. 8 in order to stop further rotation of the reel motor, inasmuch as the tape is fully retracted.

Dual section decade counters 490 and 492 are interconnected to the counters 470-476. Similarly, shift registers 494 and 496 are interconnected with counters 470-476 as illustrated. Shift register 498 is connected in parallel with registers 494 and 496.

As previously noted, the switches 480-486 are located, along with switches 260 and 258 (FIG. 8), in the top of the water level detector module 14 (FIG. 5). When a magnet is held adjacent the switches, the switches momentarily close and load in a count into the counters 470-476. Debouncing circuitry 500 are provided between the switches and the counters 490-492.

By selectively operating the switches 480-486 with a permanent magnet, any desired manhole depth may be set into the system. Switch 480 controls the ten's position, switch 482 controls the units position, switch 484 controls the tenths position and switch 486 controls the one hundredths position. If the depth of 12.34 feet is desired to be set into the system, switch 480 would be closed once, switch 482 would be closed twice, switch 484 would be closed three times and switch 486 would be closed four times. It will be understood that other devices such as thumbwheel switches and the like could be used to set in the desired manhole depth, but the present magnetically operated switch embodiment enables depth settings to be made without disturbing the hermetic seal of the invention. This sealing is important in the dirty environment of sewers.

The counters 490 and 492 store the depth input to the switches 480 and 486. Counters 490 and 492 are only activated when the probes 30 are fully withdrawn, whereupon a withdrawn input from the circuitry of FIG. 8 is applied via terminal 350. The tape 28 is then lowered until the depth stored in counters 490 and 492 is stored in the counters 470-476, after which a zero limit output is generated on terminal 502 in order to stop further downward movement of the probes.

As previously noted, the counters 470-476 count the pulses generated from gates 430 and 432 in order to keep track of how far the tape 28 moves. When the tape is fully withdrawn in the midnight reset mode, the counters 470-476 load in the number stored in counters 490 and 492.

Registers 494, 496 and 498 are parallel in-serial out shift registers which load in the contents of 470-476 when a shift load input signal is applied from the circuitry of FIG. 8 to terminal 504. Registers 494-496 thus store the position of the tape when the probes 30 first touch the level of the water and provide an indication of the level of the water. The shift register 498 has a hard wired identification code stored therein representing identification of the particular module. The data stored in registers 494-498 is shifted serially out in response to a clock input applied on terminal 506 out via the data output terminal 508. The data output is applied to the controller module circuitry for recording on the recorder 12 in the manner previously described.

The count contained in counters 474 and 476 is carried between the counters. Counter 476 senses one hundredth of a foot. An Up carry output carrier signal is applied to terminal 507 for application to counter 360 (FIG. 8) to determine when the probes 30 have been raised six inches above the level of water. At this point, as previously described, the probes 30 are stopped. The zero limit output applied to terminal 502 represents a down count operable to generate a pulse which sets the zero flip-flop 366 in FIG. 8.

It will thus be apparent that the circuitry of FIGS. 8 and 9 control the automatic and manual raising and lowering of the probes 30, while detecting at all times the position of the probes in order to provide accurate information for recording of the water level.

The rainfall detector 16 may comprise a conventional rainfall detector including a bucket which tips when one hundredth of a foot of rain is collected therein. Each time the bucket tips, a register records a bit. When the first bit is collected in the register, a pulse is applied to the control module for recording on the recorder 12. Thereafter, the register total is recorded at regular intervals, until the midnight reset occurs.

It will be understood that a variety of other sensors and detectors could be utilized with the present invention to provide automatic recording of data therefrom. For example, a traffic counter may be substituted for the rainfall detector. The water level detector, and any number of a wide variety of sensors and detectors, may be combined with the system to meet desired operating characteristics. The present system is constructed to withstand severe environmental conditions, while providing automatic recording of vital information. The present system may be interconnected in a modular form in order to meet recording requirements for a variety of environments and conditions.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An automatic data acquisition system for recording data in a sewage system comprising:

a control module including circuitry for generating control signals and for receiving digital data and further including a plurality of input terminals, a plurality of sensor modules each including means for sensing a different physical characteristic of the sewage system, each of said sensor modules including means for being removably connected to one of said input terminals and operable in response to said control signals for inputting digital data representative of the sensed physical characteristics to said control module along with identification data identifying the source of said digital data, a first one of said sensor modules sensing the level of water in a portion of the sewage system, a second one of said sensor modules sensing the amount of rainfall in the area of the sewage system, a recorder module including means for being removably connected to one of said input terminals and including a removable recording cassette, said recorder module having a recording head for periodically and sequentially recording digital and identification data from said sensor modules, said control module periodically interrogating said sensor modules in a preset sequential order and receiving digital and identification data transmitted from said sensor modules and causing said data to be recorded on said recording cassette, clock means in said control module for generating time signals representative of the day of the year and the time of the day, and means transmitting said time signals to said recorder module for recording on said recording cassette.

2. The automatic data acquisition system of claim 1 wherein one of said sensors detects a physical characteristic having analog signal characteristics and including means for converting said analog signal characteristics to digital signals.

3. Apparatus for recording data in a sewage system having a manhole comprising:

a split expansion ring having a diameter approximating the inner diameter of the manhole and having means for expanding the diameter of said ring for rigidly attaching said ring against the manhole interior near the upper region of the manhole, said expansion ring including connectors at spaced points around said ring, a plurality of hermetically sealed electronic modules each having means for removably attaching to said connectors and including electrical cables for electrically interconnecting said modules, a plurality of said modules including means for sensing physical characteristics of said sewage system and for generating electrical representations of said physical characteristics, and one of said modules including means for recording said electrical representations.

4. The apparatus of claim 3 and further comprising:

control means for periodically interrogating each of said modules and for causing said electrical representations from said modules to be periodically recorded on said recording means.

5. The apparatus of claim 4 wherein said control means generates clock signals representative of the day of the year and the hour of the day for recording on said recording means in association with said electrical representations.

6. The apparatus of claim 3 wherein said means for sensing physical characteristics include means for sensing the level of water in the manhole and the amount of rainfall in the area of the manhole.

7. The apparatus of claim 6 wherein said means for sensing the level of water in the manhole comprises:

probe means for detecting the presence of water, means for periodically lowering said probe means into contact with the water, and means for determining the level of the probe means each time it contacts the water.

8. The apparatus of claim 3 wherein said means for recording comprises:

a recording head responsive to said electrical representations, magnetic tape movable past said recording head, and an electrical stepping motor connected to step said magnetic tape past said recording head.

9. The apparatus of claim 3 wherein said means for expanding the diameter of said ring comprises:

a lever pivotally connected to one end of said split expansion ring, catch apertures formed in the other end of said split expansion ring, and a hook member pivotally attached to said lever for being received within one of said catch apertures, wherein movement of said lever causes said ring to be expanded against the inner diameter of the manhole.

10. Apparatus for automatically sensing and recording data in a sewage manhole comprising:

a hermetically sealed control module having circuitry for providing timing and control signals, a water level detector connected to said control module for detecting and storing the level of water in the manhole, a rainfall detector connected to said control module for detecting and storing the amount of rainfall, recording means connected to said control module for recording the level of water and the amount of rainfall detected by said detectors, display means on said control module having magnetically energizable switches completely disposed within said hermetically sealed module, said display means operable to display data received from said detectors, and magnetic means for actuating said switches from the exterior of said module in order to selectively display data generated from said detectors.

11. The apparatus of claim 10 and further comprising:

an analog sensor connected to said control module for detecting physical characteristics having analog characteristics, and means for converting said analog characteristics into digital signals.

12. The apparatus of claim 10 wherein one of said switches may be actuated to display the day of the year on said display means.

13. The apparatus of claim 10 wherein one of said switches may be actuated to display the time of the day on said display means.

14. The apparatus of claim 10 wherein each of said detectors generates a data available signal to said control module when new data has been detected and stored in said detector, said control module transmitting clocking signals to said detector in response to said data available signal, said clocking signals causing data stored in said detector to be clocked out to said control module.

15. The apparatus of claim 10 wherein said control module generates timing signals, said recording means recording said timing signals in conjunction with data from said detectors.

16. The apparatus of claim 10 wherein said water level detector periodically senses the level of water in the manhole.

* * * * *